US012595391B2

(12) United States Patent
Audebet et al.

(10) Patent No.: US 12,595,391 B2
(45) Date of Patent: Apr. 7, 2026

(54) FLAME-RETARDANT CABLE WITH SELF-EXTINGUISHING COATING LAYER

(71) Applicant: Prysmian S.p.A., Milan (IT)

(72) Inventors: Pauline Audebet, Milan (IT); Vito Scrima, Milan (IT); Luigi Caimi, Lomagna (IT); Flavio Casiraghi, Osnago (IT); Serge Colombier, Malay le Grand (FR); Sergio Gutierrez, Vilanova i la Geltrú (ES)

(73) Assignee: Prysmian S.p.A., Milan (IT)

( * ) Notice: Subject to any disclaimer, the term of this patent is extended or adjusted under 35 U.S.C. 154(b) by 380 days.

(21) Appl. No.: 18/089,645

(22) Filed: Dec. 28, 2022

(65) Prior Publication Data

US 2023/0212415 A1 Jul. 6, 2023

(30) Foreign Application Priority Data

Dec. 30, 2021 (EP) ...................................... 21383239

(51) Int. Cl.
 *C09D 131/04* (2006.01)
 *C08K 3/22* (2006.01)
 (Continued)

(52) U.S. Cl.
 CPC .............. *C09D 131/04* (2013.01); *C09D 7/61* (2018.01); *C09D 7/63* (2018.01); *C09D 7/65* (2018.01);
 (Continued)

(58) Field of Classification Search
 CPC .......... C09D 131/04; C09D 7/61; C09D 7/63; C09D 7/65; C09D 123/0853; C09D 5/18;
 (Continued)

(56) References Cited

U.S. PATENT DOCUMENTS 6,256,966 B1 * 7/2001 Braun ................. C08L 23/0815
 525/240
6,388,015 B1 * 5/2002 Aimura ................. C08L 15/005
 525/193
(Continued)

FOREIGN PATENT DOCUMENTS

CN 103073776 A 5/2013
CN 105037911 A 11/2015
(Continued)

OTHER PUBLICATIONS

High Density Polyethylene Degradation Followed by Closed-loop Recycling, Nathalie Benoit, Rubén González-Núñez, and Denis Rodrigue, Progress in Rubber, Plastics and Recycling Technology 2017 33:1, 17-38.*

(Continued)

*Primary Examiner* — Jennifer A Gillett
(74) *Attorney, Agent, or Firm* — Element IP, PLC

(57) ABSTRACT

A flame-retardant cable is disclosed, the cable having a core comprising at least one conductor, and a coating layer made from a low smoke zero halogen flame-retardant polymer composition comprising an ethylene vinyl acetate copolymer and a polyethylene having a density lower than 0.925 g/cm³ as polymeric base added with:
 a) from 110 to 160 phr of at least one metal hydroxide;
 b) from 1 to 7 phr of a phyllosilicate clay;
 c) from 1 to 7 phr of melamine or a derivate thereof; and
 d) from 1 to 7 phr of zinc borate.

15 Claims, 2 Drawing Sheets

Figure 1:
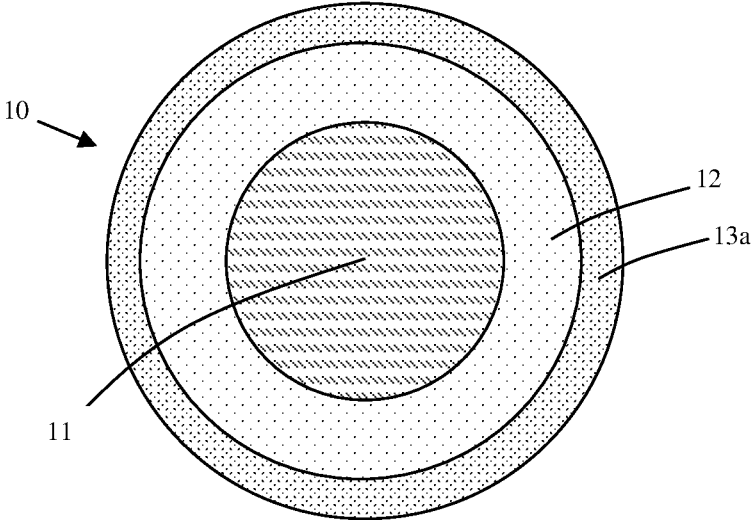

(51) Int. Cl.

| | |
|---|---|
| *C08K 3/34* | (2006.01) |
| *C08K 3/38* | (2006.01) |
| *C09D 7/61* | (2018.01) |
| *C09D 7/63* | (2018.01) |
| *C09D 7/65* | (2018.01) |
| *H01B 7/295* | (2006.01) |

(52) U.S. Cl.

CPC ..... *H01B 7/295* (2013.01); *C08K 2003/2224* (2013.01); *C08K 3/346* (2013.01); *C08K 2003/387* (2013.01)

(58) Field of Classification Search

CPC ...... G02B 6/4436; H01B 7/295; C08K 3/346; C08K 2003/2224; C08K 2003/387; C08K 5/34922; C08K 3/38; C08K 3/22; C08L 2201/02; C08L 2201/22; C08L 2203/202; C08L 23/0815

See application file for complete search history.

(56) References Cited

U.S. PATENT DOCUMENTS

| | | | |
|---|---|---|---|
| 6,414,059 B1 * | 7/2002 | Kobayashi .......... | H02G 15/003 |
| | | | 524/436 |
| 6,924,334 B1 | 8/2005 | Fukatani et al. | |
| 2006/0269771 A1 * | 11/2006 | Cogen ..................... | C09D 5/18 |
| | | | 252/604 |
| 2008/0093107 A1 | 4/2008 | Amigouet et al. | |
| 2010/0069545 A1 * | 3/2010 | Gau ................... | C08L 23/0846 |
| | | | 524/433 |
| 2013/0220667 A1 * | 8/2013 | Millan Perez ......... | C08L 23/08 |
| | | | 174/120 SR |

FOREIGN PATENT DOCUMENTS

| | | |
|---|---|---|
| CN | 108164792 A | 6/2018 |
| EP | 1582562 A1 | 10/2005 |
| JP | 2007070483 A | 3/2007 |

OTHER PUBLICATIONS

English Machine translation of CN 108164792.*
European Search Report issued Jun. 15, 2022 in Patent Application No. EP21383239, 3 pages.

* cited by examiner

FLAME-RETARDANT CABLE WITH SELF-EXTINGUISHING COATING LAYER

FIELD OF APPLICATION

The present disclosure relates to a flame-retardant cable.

In particular, the present disclosure relates to a flame-retardant electrical, optical or hybrid cable having a low-smoke zero-halogen (LSOH) self-extinguishing coating layer which exhibits substantially no dripping (occurrence of flaming droplets) when exposed to high temperatures, e.g. in case of fire.

PRIOR ART

As known, an important requirement for cables, especially for building or transport application, is a suitable behaviour in case of fire to avoid flame propagation and smoke generation in populated environment.

In this connection, international qualification standards require that, in case of fire, cables, either electric or optical or both (hybrid cables), have limited flame and toxic smoke production and spread, and low or no flaming droplets production. Such standards are more and more stringent about the performances required to a flame-retardant cable to the end of improving the safety in buildings and transports in case of fire.

The performances against fire can be assured by one or more cable coatings, such as the electric insulation or a cable sheath, endowed with certain properties when flamed.

In this connection, it is known to produce a cable coating from a polymer composition provided with fire resistance and/or flame-retardant properties by the addition of suitable fillers. In particular, the production of flame-retardant cables is currently directed towards the use of halogen-free and low-smoke materials (LSOH) using polyolefin-based compositions (e.g. polyethylene and/or polyethylene copolymers, optionally cross-linked) filled with inorganic hydroxide fillers, such as magnesium hydroxide and/or aluminium hydroxide, which confer flame-retardant properties to a cable coating layer.

However, this solution has the drawback of requiring large quantities of filler in order to achieve a satisfactory level of effectiveness in terms of retarding the flame propagation or self-extinguishing properties. By way of example, the amount of metallic hydroxide(s) such as aluminium hydroxide and/or magnesium hydroxide should typically range from 170 to 200 phr of the total polymeric composition. The use of such amounts can lead to a considerable increase in the viscosity of the material and consequently to a significant decrease in extrusion speeds, thus leading to a drop in productivity. Adding high quantities of flame-retardant additives as above also may lead to a substantial deterioration in the mechanical properties of the resulting cable.

Moreover, the use of the above amounts of flame-retardant fillers, such as magnesium hydroxide and/or aluminium hydroxide, to the polymer base material of the cable does not prevent the formation of flaming droplets when the cable is exposed to high temperatures e.g. in case of fire, unless the flame-retardant filler is used in great amount which, as said above, could impair the mechanical features of the cable, beside increasing its cost and the manufacturing difficulty.

JP2007070483 relates to a non-halogen flame retardant composition for covering electric wires and cables. The composition is composed of an ethylene-based polymer, and (a) 30 to 100 parts by weight of a metal hydroxide per 100 parts by weight of the ethylene-based polymer, (b) 1 to 10 parts by weight of nanoclay. Examples of the (a) metal hydroxide include magnesium hydroxide and aluminium hydroxide. The nanoclay of (b) is layered such as montmorillonite or bentonite and is said to have dripping prevention property at the time of the combustion. However, JP2007070483 states that although this effect is remarkable when aluminium hydroxide is used for the metal hydroxide of (a), it is hardly recognized when magnesium hydroxide is used. Other non-halogen flame retardants can also be blended within a range that does not impair the effects sought. Such halogen-free flame retardants include melamine-based nitrogen-based flame retardants, and calcium carbonate.

CN108164792 relates to a small-diameter cable cross-linked low-smoke halogen-free flame-retardant polyolefin insulation material irradiated at 105° C., which comprises, inter alia, the following parts by weight: ethylene-vinyl acetate 40~70; high density polyethylene 10~50; compatilizer (such as maleic anhydride grafted metallocene LLDPE) 10~20; flame retardant A (at least one of magnesium hydroxide, aluminium hydroxide and basic magnesium carbonate) 140~180, and flame retardant B (at least one of melamine, melamine polyphosphate, zinc borate, ammonium polyphosphate and red phosphorous flame retardant) 2~10.

U.S. Pat. No. 6,924,334 relates to a polyolefin resin composition having good flame retardancy and a thermoplastic resin for cable jacketing or sheathing which comprises said resin composition. The polyolefin resin composition comprises 100 parts by weight of a polyolefin resin and 0.1 to 100 parts by weight of a layered silicate, which is preferably montmorillonite. The polyolefin resin composition further comprises 0.5 to 100 parts by weight of at least one compound selected from the group consisting of metal hydroxides and melamine derivatives.

CN105037911 relates to a polyolefin insulating material for cable insulating layer which includes a material A and a material B wherein the material A contains, inter alia, the following components in parts by weight: EVA 10~80, PE 10~100, silane coupling agent 1~3, flame retardant 50~100, filler 50~200; and wherein the material B contains, inter alia, the following components in parts by weight: EVA 10~80, PE 10~100, catalyst 0.1~3, flame retardant 50~100, filling Agent 50~200. In the A and B materials, the flame retardant is, inter alia, aluminium hydroxide, magnesium hydroxide, zinc borate, hydrotalcite, brucite, magnesium oxide, antimony trioxide, barium sulfate, montmorillonite, one or more of urea, melamine, and triglycidyl isocyanurate in any ratio.

In view of the above, cables having a coating layer based on polymer compositions including a mixture of flame-retardant filler(s) and flame-retardant aid(s) are to be carefully considered. The combination of different fillers/additives or of different amounts thereof can, in fact, provide unpredictable and unwanted results.

SUMMARY OF THE DISCLOSURE

Thus, a main object of the present disclosure is providing a flame-retardant cable having a self-extinguishing coating layer which exhibits substantially no dripping (occurrence of flaming droplets) when exposed to high temperatures, e.g. in case of fire, so as to meet the stricter requirements for certification according to the current international standards.

Another object of the present disclosure is providing a flame-retardant cable as above which, in addition to exhibit substantially no dripping under fire, maintains good mechanical properties and is easily workable, particularly in extrusion processes.

The Applicant found that a cable, either electric or optical or hybrid, exhibits improved flame-retardant and self-extinguishing properties, particularly a substantially null dripping under fire, when it is provided with a coating layer made of a polymer composition comprising at least one metal hydroxide as flame-retardant filler and a specific combination of flame-retardant aids in specific amount ranges.

Accordingly, the present disclosure relates to a flame-retardant cable having a core comprising at least one conductor, and a coating layer made from a low smoke zero halogen (LSOH) flame-retardant polymer composition comprising an ethylene vinyl acetate copolymer and a polyethylene polymer having a density up to 0.935 g/cm³ as halogen-free polymeric base, and:

a) from 110 to 160 phr of at least one metal hydroxide;
    b) from 0.5 to 5 phr of a phyllosilicate clay;
    c) from 1 to 7 phr of melamine or a derivate thereof; and
    d) from 1 to 7 phr of zinc borate.

In an embodiment, the ethylene vinyl acetate (EVA) copolymer is present in an amount of from 65 to 90 phr. In an embodiment, the polyethylene (PE) polymer is present in an amount of from 10 to 45 phr.

In an embodiment, the polyethylene polymer has a melt flow (a.k.a. melt flow index MFI or melt flow rate MFR) lower than 10 grams per 10 minutes, for example, lower than 5 grams per 10 minutes as determined under ASTM D-1238 (2004).

In an embodiment, the halogen-free polymeric base comprises an amount from 5 to 15 phr of an anhydride-modified or silane-modified polymer selected from at least one of ethylene vinyl acetate copolymer and polyethylene polymer. For example, the polymer can be modified with maleic anhydride or modified with vinyl-trimethoxysilane.

In an embodiment, the flame-retardant polymer composition also comprises from 20 to 80 phr, for example from 30 to 70 phr, of an alkali or alkaline-earth metal carbonate such as calcium carbonate.

In an embodiment, the flame-retardant polymer composition comprises from 1 to 3 phr of a phyllosilicate clay.

In an embodiment, the flame-retardant polymer composition comprises from 1 to 5 phr of melamine or a derivate thereof.

The cable according to the present disclosure can be an electric or an optical cable. In the first case, the core comprises an electric conductor made, for example, of an electrically conductive metal surrounded by electrically insulating layer or system (made by an inner semiconductive layer surrounded by an insulating layer, in turn optionally surrounded by an outer semiconductive layer). In the second case, the core comprises an optical fibre comprising a glass core and one or more polymeric protective layers made, for example, of cured acrylate and/or polyolefin composition up to a diameter of about 1,000 μm. The cable of the present disclosure can also comprise both electric conductor/s and optical fibre/s, thus being a hybrid cable.

The electric cable according to the present disclosure can be suitable for telecommunication or for carrying current at low voltage (LV; up to 1 kV) or medium voltage (MV; from 1 to 30-35 kV). The electric cable of the disclosure can be a single core or a three-phase one.

In an embodiment, the coating layer made from the polymeric composition of the present disclosure can be a sheath surrounding the conductor. In the case of an electric cable, the present coating can be a jacket surrounding an electrically insulating layer which can be flame-retardant or not. In the case of an optical cable, the present coating can be a module containing the optical fibre/s or a tube surrounding the optical fibres, optionally contained in module/s, and other cable components such strength members or as water barrier layer. In the case of a hybrid cable, the above-mentioned possibilities are envisaged, mutatis mutandis. In an embodiment, the coating layer is the outermost cable layer.

In another embodiment, the coating layer made from the polymeric composition of the present disclosure can be a skin layer covering the outermost cable layer. In an embodiment, the skin layer has a thickness of from 0.05 to 0.5 mm.

The Applicant found that a cable provided with a flame-retardant and self-extinguishing coating layer made from a composition as specified above has improved reaction to fire in terms of self-extinguishing capacity and a substantially absence of dripping during burning which allow the cable to be certified to pass specific qualification standards, like the EU Construction Products Regulation 305/2011 ('the CPR'). In addition, the Applicant found that the provision of a coating layer as specified above allows imparting suitable flame-retardant properties and substantially no dripping under fire to the cable without impairing its mechanical properties as well as allowing a suitable workability of the polymer material forming the coating layer, particularly in the extrusion step of the cable manufacturing.

DETAILED DESCRIPTION

For the purpose of the present description and of the appended claims, the words "a" or "an" should be read to include one or at least one and the singular also includes the plural unless it is obvious that it is meant otherwise. This is done merely for convenience and to give a general sense of the disclosure.

Within the present description and the subsequent claims, unless indicated otherwise, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated therein.

Moreover, in the present description, it is to be understood that the technical features described specifically above and below can be combined with each other in any way, constituting further embodiments of the present disclosure which may not be specifically described for conciseness, but which fall within the scope of the present disclosure.

In the present description and claims, unless specified otherwise, the amount of the components of the flame-retardant polymer composition is given in phr where the term "phr" is used to indicate parts by weight per 100 parts by weight of the base polymeric material.

In the present description the amount of the components of the flame-retardant polymer composition can also be given in percent by weight (wt %) where the term "wt %" is used to indicate percent by weight with respect to the total amount of the composition.

Figure 2:
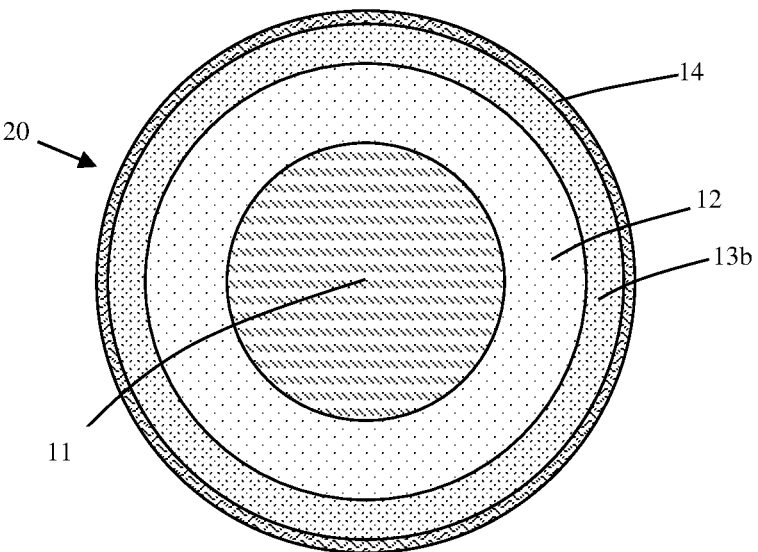
Figure 3:
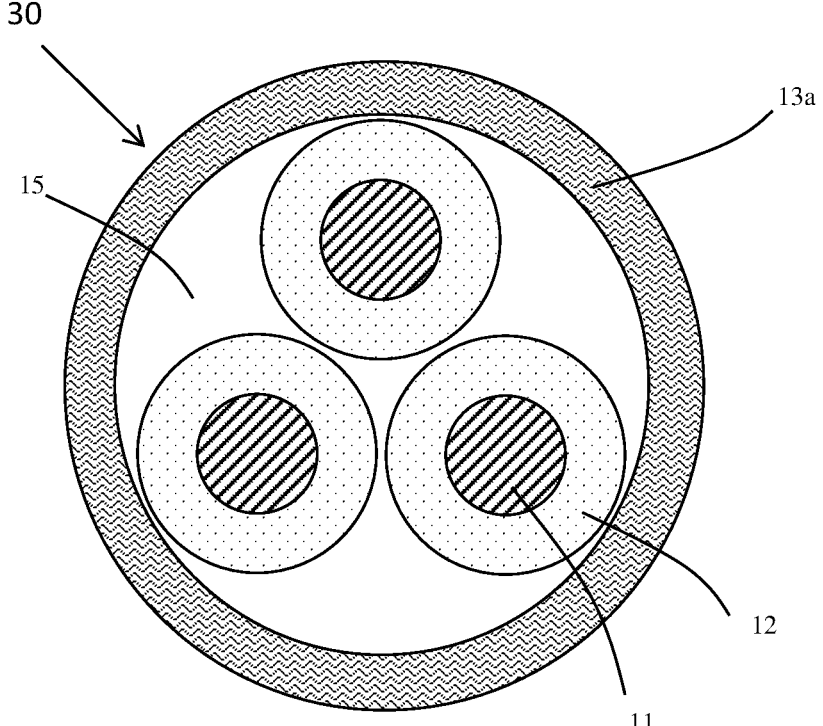
Figure 4:
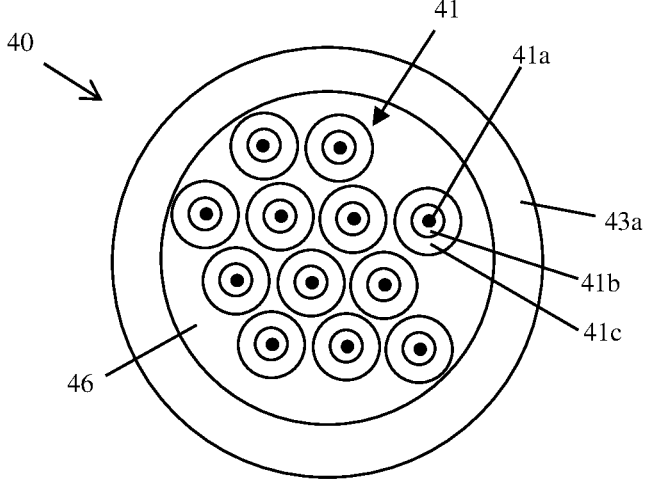

The features and advantages of the present disclosure will be made apparent by the following detailed description of some exemplary embodiments thereof, provided merely by way of non-limiting examples, description that will be conducted also by referring to the attached drawings, wherein FIG. 1 is a cross-sectional view of an electric cable according to the present disclosure; and FIG. 2 is a cross-sectional view of another electric cable according to the present disclosure;

FIG. 3 is a cross-sectional view of a three-phase electric cable according to the present disclosure; and FIG. 4 is a cross-sectional view of an optical cable according to the present disclosure.

FIG. 1 shows a low voltage (LV) electric cable 10 according to a non-limiting embodiment of the disclosure. Cable 10 has a single core comprising a conductor 11 made of an electrically conductive material, e.g. at least one of aluminium, copper or carbon nanotubes. The conductor 11 may be in the form of a solid bar or a of bundle of wires, optionally stranded.

The conductor 11 is electrically insulated by an insulating layer 12 in form of an extruded polymeric coating optionally having flame-retardant properties. For example, the insulating layer 12 can be made of an extruded polymeric material such as polyethylene or a polyethylene mixture, optionally filled with flame-retardant fillers, such as magnesium or aluminium hydroxide, but not the other components of the polymeric composition according to the present disclosure.

In the embodiment shown in FIG. 1, the insulating layer 12 is extruded in direct contact with the conductor 11.

Cable 10 comprises a jacket 13a as outermost layer, made of a polymeric material. The jacket 13a surrounds the insulating layer 12 and, optionally, is in direct contact thereto. The jacket 13a is manufactured by extrusion. The jacket 13a has a thickness suitable for providing the cable with mechanical protection.

In cable 10 the jacket 13a is made of a polymeric composition according to the present disclosure.

FIG. 2 shows a low voltage (LV) electric cable 20 according to another non-limiting embodiment of the disclosure. In the cable 20, those features that are structurally and/or functionally equivalent to corresponding features of the cable 10 described above will be assigned the same reference numbers of the latter and will not be further described for conciseness.

The cable 20 differs from the cable 10 described above in that the outermost layer is a skin layer 14, made of the polymeric composition according to the present disclosure. The skin layer 14 surrounds and directly contacts a jacket 13b.

The skin layer 14 is manufactured by extrusion. The skin layer 14 has a thickness substantially smaller than that of the jacket 13b (of from 0.05 to 0.5 mm, for example of from 0.1 to 0.2 mm) and does not provide significant mechanical protection to the cable 20.

In this embodiment, the insulating layer 12 can be made of an extruded LSOH polymer material, e.g. LSOH polymer material including a base polymer such as polyethylene or a polyethylene mixture, filled with flame-retardant fillers, such as magnesium or aluminium hydroxide, but not the other components of the polymeric composition according to the present disclosure.

FIG. 3 shows a low voltage (LV) electric cable 30 according to another non-limiting embodiment of the disclosure. Cable 30 is a three-phase cable comprising three cores. Each core comprises a conductor 11 surrounded by an electrically insulating layer 12, like those described for cable 10 of FIG. 1.

The three cores are stranded and surrounded by a jacket 13a as outermost layer, said jacket having the features already described in connection to jacket 13a of cable 10 of FIG. 1. A bedding 15 made of polymeric material can be provided between the stranded cores and the jacket 13.

FIG. 4 shows an optical cable 40 according to another non-limiting embodiment of the disclosure. Cable 40 comprises a number (in this case, twelve) of conductors in form of optical fibres 41 comprising a glass core (light waveguide+cladding) 41a, a protective layer 41b (made, for example, of one or two layers of radiation cured acrylate) and a buffer layer 41c (made, for example, of an extruded polyolefin).

The optical fibres 41 are surrounded by a jacket 43a as outermost layer, said jacket being made of the polymeric composition according to the present disclosure.

Between the optical fibres 41 and the jacket 43a a filler 46 can be provided in form, for example, of a water-blocking and/or hydrogen absorbing material.

The low smoke zero halogen (LSOH) flame-retardant polymer composition according to the present disclosure comprises an ethylene vinyl acetate copolymer and a polyethylene polymer as halogen-free polymeric base which can be thermoplastic or crosslinked.

Polyethylene (PE) polymer, as the term is used therein, means polyethylene homopolymer or copolymer of ethylene with one or more alpha-olefins having 3 to 12 carbon atoms, and, optionally, comprising a diene. The halogen free polymer mixture of the present disclosure can comprise one or more polyethylene polymers.

In an embodiment, the polyethylene polymer has a density of at least 0.860 $g/cm^3$.

The polyethylene polymer can have a melt index lower than 10 grams per 10 minutes, for example lower than 5 grams per 10 minutes as determined under ASTM D-1238 (2004). The polyethylene polymer can have a melt index of at least 0.6 grams per 10 minutes.

Suitable polyethylenes for the flame-retardant polymer composition according to the present disclosure include low density homopolymers of ethylene (LDPEs), linear low density polyethylenes (LLDPEs), very low density polyethylenes (VLDPEs), ultra-low density polyethylenes (ULDPEs), metallocene copolymers and mixtures thereof.

In an embodiment, the halogen free base polymer of the flame-retardant composition of the present disclosure includes a copolymer of ethylene with 1-butene, 1-hexene and 1-octene.

The ethylene vinyl acetate (EVA) copolymer of the flame-retardant polymer composition according to the present disclosure can be any copolymer of ethylene with vinyl acetate as co-monomer.

In an embodiment, the amount of vinyl acetate (VA) co-monomer in the EVA copolymer can be from 15 wt % to 60 wt %, e.g. from 20 wt % to 40 wt % on the weight of the copolymer.

In an embodiment, the halogen free polymeric base of the flame-retardant composition of the present disclosure is made of or includes a mixture of a LLDPE or a VLDPE and an ethylene vinyl acetate (EVA) copolymer.

In an embodiment, the polyethylene of the polymeric base of the present flame-retardant composition is a metallocene LLDPE.

In an embodiment, the amount of the EVA copolymer in the polymeric base of the of the flame-retardant composition of the present disclosure range from 65 to 90 phr. In an embodiment, the polyethylene (PE) polymer is present in an amount of from 10 to 45 phr, for example from 15 to 30 phr.

In case of a crosslinked polymer base for the present composition, the crosslinking is carried out by silane/per-oxide. Suitable silane crosslinking agents are vinyltrimethoxysilane and vinyltriethoxysilane.

The flame-retardant polymer composition of the present disclosure further comprises a metal hydroxide in an amount from 110 phr to 160 phr. In an embodiment, the flame-retardant polymer composition of the present disclosure comprises a metal hydroxide in amount from 120 phr to 150 phr.

In an embodiment, the metal hydroxide is selected from magnesium hydroxide, aluminium hydroxide or a combination thereof. Both magnesium hydroxide and aluminium hydroxide can be of natural or synthetic origin. An example of metal hydroxide suitable for the present cable is magnesium hydroxide, for example of natural origin (brucite), optionally surface treated.

The flame-retardant polymer composition of the present disclosure further comprises a phyllosilicate clay in an amount from 0.5 to 5 phr, for example in an amount from 1 to 3 phr.

The phyllosilicate clay can be layered.

The phyllosilicate clay can be selected from the group consisting of bentonite, montmorillonite, magadiite, saponite, laponite, sepiolite, attapulgite, hectorite, beidellite, vermiculite, kaolinite, nontronite, volkonskoite, stevensite, pyrosite, sauconite, kenyaite and combinations thereof. In an embodiment, the phyllosilicate clay in the composition of the present disclosure is selected from montmorillonite or bentonite.

The phyllosilicate clay may be naturally occurring or chemically modified.

In an embodiment, the phyllosilicate clay suitable for the present composition is chemically modified, for example by coating. This is obtained, for example, by exchanging some of the cations (for example, sodium ions) in the phyllosilicate clay, by surface treatment with an ammonium or phosphonium cation-containing compound, such as a salt. Suitable coated phyllosilicate clays for the cable of the present disclosure contain, for example, alkyl or polyol ammonium or phosphonium.

In an embodiment, an ammonium coated phyllosilicate clay contains (is surface treated with) dimethyl, di(hydrogenated tallow) ammonium.

In an embodiment, the phyllosilicate clay included in the flame-retardant polymer composition of the present disclosure has average particle size dimensions (average particle size $d_{50}$) of from 5 to 35 µm.

In an embodiment, the phyllosilicate clay included in the flame-retardant polymer composition of the present disclosure is a montmorillonite. Montmorillonite may be chemically modified. In an embodiment, a naturally occurring montmorillonite may be purified according to conventional purification processes before its use in the flame-retardant polymer composition of the present disclosure.

The phyllosilicate clay acts essentially as flame-retardant aid. The presence of a phyllosilicate clay in the flame-retardant polymeric composition of the present disclosure in the amount indicated above allows improving the flame-retardant properties in combination with the metal hydroxide and also allows reducing the amount of metal hydroxide to be used in the flame-retardant polymer composition, thereby preventing the mechanical properties of the polymer composition from deteriorating while maintaining good workability by decreasing the viscosity of the polymer composition.

Furthermore, the phyllosilicate clay increases the resistance to dripping of the polymeric material forming the coating layer of the cable.

The flame-retardant polymer composition of the present disclosure further comprises melamine or a derivative thereof in an amount from 1 to 7 phr.

Examples of melamine derivatives that can be included in the flame-retardant polymer composition of the present disclosure include melamine cyanurate, melamine isocyanurate, melamine phosphate, melamine pyrophosphate and melamine polyphosphate.

An amount of melamine or a derivative thereof lower than 1 phr brings no substantial effect in the flame-retardant polymer composition; while an amount of melamine or a derivate thereof more than 7 phr can produce undesired amounts of potentially irritating and/or toxic fumes as, under fire, melamine undergoes progressive endothermic condensation with the release of ammonia.

In an embodiment, the amount of melamine or a derivative thereof in the flame-retardant polymer composition of the present disclosure is 5 phr.

The flame-retardant polymer composition of the present disclosure further comprises zinc borate in an amount from 1 to 7 phr, for example in an amount from 3 to 5 phr.

The presence of zinc borate in the flame-retardant polymeric composition of the present disclosure in the amount indicated above can allow improving the resistance to dripping of the polymer material forming a coating layer of a cable made from flame-retardant polymeric composition of the present disclosure by promoting the formation of substantially compact and homogeneous cohesive carbon residues ("char") of such coating layer when it is exposed to a flame, for example in the event of a fire.

In an embodiment, the overall amount of phyllosilicate clay, melamine or a derivate thereof and zinc borate is of 17 phr at most.

Applicant experienced that the presence of flame-retardant aids consisting of a combination of a phyllosilicate clay, melamine or a derivative thereof, and zinc borate in the respective amount ranges as indicated above in a flame-retardant polymer composition used for the manufacture of a coating layer of a cable, not only contributes to improve the flame-retardant properties of the cable in combination with the metal hydroxide, but also increases significantly the self-extinguishing capacity and the resistance to dripping of the polymer material forming such coating layer.

As shown in the examples, flame-retardant polymer compositions according to the present disclosure exhibit self-extinguishing behaviour and no flaming droplet production (dripping) when exposed, even repeatedly, to flame, thereby meeting the stricter requirements for certification according to the current international standards such as the above mentioned CPR.

At the same time, mechanical properties of the cable and the workability of the polymer composition, particularly in extrusion processes, are not impaired.

In an embodiment, the flame-retardant polymer composition of the present disclosure further comprises an alkali or alkaline-earth metal carbonate in an amount from 20 to 80 phr as further flame-retardant aid. For example, alkali or alkaline-earth metal carbonate is present in an amount of from 30 to 70 phr.

A suitable alkali or alkaline-earth metal carbonate (hereinafter also referred to as "carbonate") for the present composition can be selected from sodium carbonate, magnesium carbonate, calcium carbonate potassium carbonate, lithium carbonate or mixture thereof, either synthetic or naturally occurring, like, for example, dolomite. In an embodiment, the flame-retardant polymer composition of the present disclosure comprises calcium carbonate.

The amount of carbonate in the flame-retardant polymer composition of the disclosure can be chosen by the skilled person in such a way to not impair the mechanical properties and the electrical properties of the cable formed using such a polymer composition.

The presence of carbonate as indicated above may allow reducing the amount of metal hydroxide to be used in the flame-retardant polymer composition while maintaining suitable anti-dripping properties of the cable coating layer made from such composition as well as suitable mechanical properties and good workability by decreasing the viscosity of the polymer composition.

The flame-retardant polymer composition may further comprise conventional components such as antioxidants, processing aids, stabilizers, pigments, coupling agents, etc.

Conventional antioxidants which are suitable for this purpose are by way of example: 4,4'-thiobis(3-methyl-6-tert-butyl) phenol, pentaerythritol tetrakis [3-(3,5-di-terz-butyl-4-hydroxyphenyl) propionate], 2,2'-thio-diethylene-bis-[3-(3,5-di-tert-butyl-4-hydroxyphenyl) propionate] and the like or mixtures thereof.

Processing aids usually added to the base polymer are, for example, calcium stearate, zinc stearate, stearic acid, paraffin wax, silicone rubbers, polisiloxanes and the like, and mixtures thereof.

The lubricants used are, for example, paraffin waxes of low molecular weight, stearic acid, stearammide, oleammide, erucamide.

In an embodiment, the flame-retardant polymer composition according to the present disclosure can also comprise at least one polysiloxane as processing aid.

The amount of the at least one polysiloxane in the present flame-retardant polymer composition can range from 1 to 7 phr.

The polysiloxane may be any compound comprising a main chain of repeating —Si—O— unit and side chains chosen from a linear or branched alkyl group having from 1 to 6 carbon atoms, a linear or branched alkoxy group having from 1 to 6 carbon atoms, a linear or branched alkenyl group, e.g. vinyl group, having from 1 to 6 carbon atoms, a phenyl group, a phenoxy group and their combinations.

In an embodiment, the polysiloxane is polydimethylsiloxane.

The presence of at least one polysiloxane in the flame-retardant polymer composition according to the present disclosure for use in the manufacture of a coating layer of a cable can improve dispersion of the inorganic fillers in the polymeric matrix and helps to reduce the viscosity during extrusion thus improving the workability of the flame-retardant polymer composition.

The electric cable according to the present disclosure may be produced based on cable manufacturing techniques known to those skilled in the art. In particular, the coating layer according to the present disclosure may be formed using conventional processes with a thickness chosen to comply requirements and needs of the application for the cable.

The present disclosure will now be described with reference to the following examples which are provided for purpose of illustration only and thus are not to be construed as limiting the scope of the present disclosure in any way.

Examples

Comparative flame-retardant polymer base compositions and compositions according to the disclosure were prepared by mixing, in an open mixer, polymers, flame-retardant (metal hydroxide), flame-retardant aids and other additives as indicated in the following Table 1.

The polymeric base was made of a mixture of a LLDPE having a density of 0.911 $g/cm^3$ and EVA copolymer having a vinyl acetate (VA) content of 28%. The metal hydroxide was natural magnesium hydroxide (brucite) with no surface treatment, or precipitated aluminium hydroxide, having a $d_{50}$ particle size greater than 2 μm in either case.

The phyllosilicate clay was an ammonium coated montmorillonite having average particles dimensions of 15-20 μm. The amount of pure (free from ammonium) montmorillonite was of about 50 wt % (phr content in parenthesis) with respect to the total amount of the commercial additive.

As compatibilizer, a maleic anhydride-modified polyethylene (PE-MAH) was used and in some compositions also a polydimethylsiloxane was used as processing aid.

As "melamine" component a melamine cyanurate (1:1 mixture of 1,3,5-triazine-2,4,6(1H,3H,5H)-trione, compound and 1,3,5-triazine-2,4,6) was used.

The comparative compositions and compositions of the disclosure were then extruded from the mixer into respective samples suitable for fire-resistance tests and for evaluation of mechanical properties.

Table 1 shows the amounts of base polymers, fillers and flame-retardant and processing aids in the compositions used to produce both comparative and test samples, where the comparative samples are marked with an asterisk.

The amounts are provided as "phr", i.e. parts by weight per 100 parts by weight of the base polymers.

Elongation at break (EB) and tensile strength (TS) were evaluated according to the standard IEC 60811-1-1 (1996).

TABLE 1

| Component | Sample A* | Sample B* | Sample C | Sample D | Sample E | Sample F | Sample G | Sample H* | Sample I* | Sample J* |
|---|---|---|---|---|---|---|---|---|---|---|
| EVA | 70.0 | 70.0 | 70.0 | 70.0 | 70.0 | 70.0 | 70.0 | 70.0 | 70.0 | 70.0 |
| LLDPE | 20.0 | 20.0 | 20.0 | 20.0 | 20.0 | 20.0 | 20.0 | 20.0 | 20.0 | 20.0 |
| PE-MAH | 10.0 | 10.0 | 10.0 | 10.0 | 10.0 | 10.0 | 10.0 | 10.0 | 10.0 | 10.0 |
| Mg(OH)$_2$ | 170 | — | 140 | 140 | 140 | 120 | 120 | — | — | 24 |
| Al(OH)$_3$ | — | 170 | | | | | | 170 | 110 | 96 |
| Montmorillonite | 5.0 | 5.0 | 5.0 | 3.0 | 3.0 | 5.0 | 5.0 | 5.0 | 5.0 | 5.0 |
| | (2.5) | (2.5) | (2.5) | (1.5) | (1.5) | (2.5) | (2.5) | (2.5) | (2.5) | (2.5) |
| Zn borate | — | — | 5.0 | 3.0 | 3.0 | 5.0 | 5.0 | — | — | — |
| Melamine | 5.0 | 5.0 | 2.0 | 2.0 | 2.0 | 2.0 | 2.0 | 21.0 | 21.0 | 5.0 |
| CaCO$_3$ | — | — | — | — | — | — | 30 | — | 60 | — |
| Antioxidants | — | — | 0.8 | 0.8 | — | — | — | — | — | — |
| polydimethylsiloxane | — | — | 3.9 | 3.8 | — | — | — | — | — | — |
| 1$^{st}$ Burning Extinction | 106 sec | 180 sec | 115 sec | 102 sec | 144 sec | 103 sec | 245 sec | 33 sec | 70 sec | No |
| 1$^{st}$ Droplet/min | 0 | 0.2 | 0 | 0 | 0 | 0 | 0 | 0 | 0 | 0.2 |

TABLE 1-continued

| Component | Sample A* | Sample B* | Sample C | Sample D | Sample E | Sample F | Sample G | Sample H* | Sample I* | Sample J* |
|---|---|---|---|---|---|---|---|---|---|---|
| $2^{nd}$ Burning Extinction | 141 sec | 181 sec | 14 sec | 42 sec | 1 sec | 1 sec | 1 sec | 19 sec | No | — |
| $2^{nd}$ Droplet/min | 0 | 0.3 | 0 | 0 | 0 | 0 | 0 | 0 | 0 | — |
| EB (%) (≥100) | — | — | 136.8 | 145.9 | 128.9 | — | — | — | — | — |
| TS (MPa) (≥9) | — | — | 10.5 | 10.6 | 11 | — | — | — | — | — |

The samples were tested by a vertical flaming test to determine their self-extinguishing capacity (how long time do they burn before the flames self-extinguish) and dripping behaviour under fire conditions, according to an internal test as described below.

Each specimen (10 cm long) of a sample was vertically clamped on a support while the lower end was hanging free. Each specimen was burned a first time under the action of a flame oriented at about 90° with respect to the specimen and directed towards the lower end thereof. The flame was held in this position for 30 seconds, then the self-extinguishing time (if self-extinguishment occurred) was noted and the amount of droplet/min was evaluated. If the specimen self-extinguished, the flame was applied again and held in position for 30 seconds, then the specimen was evaluated as above again.

The test was carried out on at least two specimens for each sample and the data provided in Table 1 are an average of the results.

Table 1 above reports the results of flaming and mechanical properties tests performed on the comparative and test samples.

It can be observed that Comparative sample A had a suitable self-extinguishing behaviour and also zero droplets under fire, but its composition comprises a high amount of magnesium hydroxide, exceeding that of the present disclosure, which can impair mechanical properties. Comparative sample B, comprising an equally high amount of aluminium hydroxide, had a less satisfactory behaviour under fire (longer self-extinguishing time and some droplets).

Samples C and D according to the present disclosure, which contain a lower amount of magnesium hydroxide with respect to the Comparative samples A and B and include zinc borate, self-extinguished at both the burning tests without providing droplets and in a shorter time than the Comparative samples A and B at the second burning. A suitable behaviour under fire was also exhibited by samples E and F according to the present disclosure, which do not contain polydimethylsiloxane, and by sample G according to the present disclosure which does not contain polydimethylsiloxane and includes calcium carbonate in an amount in accordance with the present disclosure. In fact, samples E, F and G self-extinguished at both the burning tests without providing droplets as well.

Comparative sample H had a suitable self-extinguishing behaviour and zero droplets under fire, but this composition comprises high amounts of both metal hydroxide (aluminium hydroxide in this case) and melamine, exceeding that of the present disclosure.

Instead, comparative sample I differing from sample H in that it contains a lower amount of aluminium hydroxide and further includes calcium carbonate, did not self-extinguish at the second burning test, and comparative sample J containing magnesium hydroxide and aluminium hydroxide in an overall amount according to the present disclosure, melamine and phyllosilicate clay in amounts according to the present disclosure but free of zinc borate did not self-extinguish at the first burning test and provided droplets.

Mechanical properties, such as tensile strength and elongation at break, of samples C, D and E were found suitable for application in optical and electric cables.

The viscosity of the samples according to the present disclosure, evaluated e.g. according to ISO 289-1 (2015), was found appropriate for extrusion process at industrially profitable speed.

The invention claimed is:

1. A flame-retardant cable, comprising:
a core comprising at least one conductor; and
a coating layer consisting of a low smoke zero halogen flame-retardant polymer composition consisting of an ethylene vinyl acetate copolymer, a polyethylene polymer having a density up to 0.935 g/cm, and optionally an anhydride-modified or silane-modified polymer, as a halogen-free polymeric base, and:
a) 110 to 160 phr of at least one metal hydroxide;
b) 0.5 to 5 phr of a phyllosilicate clay;
c) 1 to 7 phr of melamine or a derivative thereof;
d) 1 to 7 phr of zinc borate; and
e) optionally, 20 to 80 phr of an alkali or alkaline-earth metal carbonate;
wherein:
the ethylene vinyl acetate copolymer is present in an amount of 65 to 90 phr; and
the polyethylene polymer is present in an amount of 10 to 45 phr and has a melt index of lower than 10 but at least 0.6 grams per 10 minutes.

2. The flame-retardant cable according to claim 1, wherein the coating layer is an outermost layer of the flame-retardant cable.

3. The flame-retardant cable according to claim 1, wherein:
the ethylene vinyl acetate copolymer is present in an amount of 70 to 90 phr; and
the polyethylene polymer is present in an amount of 15 to 30 phr.

4. The flame-retardant cable according to claim 1, wherein:
the halogen-free polymeric base consists of said ethylene vinyl acetate copolymer, said polyethylene polymer having a density up to 0.935 g/cm³, and said anhydride-modified polymer;
the anhydride-modified polymer is present in said halogen-free polymeric base in an amount of 5 to 15 phr; and
the anhydride-modified polymer is at least one selected from the group consisting of an anhydride-modified ethylene vinyl acetate copolymer and an anhydride-modified polyethylene polymer.

5. The flame-retardant cable according to claim 1, wherein the flame-retardant polymer composition comprises the alkali or alkaline-earth metal carbonate in an amount of 20 to 80 phr.

6. The flame-retardant cable according to claim 1, wherein the metal hydroxide is magnesium hydroxide.

7. The flame-retardant cable according to claim 1, wherein the flame-retardant polymer composition comprises the at least one metal hydroxide in an amount of 120 to 150 phr.

8. The flame-retardant cable according to claim 1, wherein the flame-retardant polymer composition comprises the phyllosilicate clay in an amount of 1 to 3 phr.

9. The flame-retardant cable according to claim 1, wherein the phyllosilicate clay is montmorillonite or bentonite.

10. The flame-retardant cable according to claim 1, wherein the flame-retardant polymer composition comprises the melamine or derivative in an amount of 1 to 5 phr.

11. The flame-retardant cable according to claim 1, wherein:

the flame-retardant polymer composition comprises the melamine derivative; and the melamine derivative is selected from the group consisting of melamine cyanurate, melamine isocyanurate, melamine phosphate, melamine pyrophosphate, and melamine polyphosphate.

12. The flame-retardant cable according to claim 1, wherein the flame-retardant polymer composition comprises the zinc borate in an amount of 3 to 5 phr.

13. The flame-retardant cable according to claim 1, wherein the flame-retardant polymer composition further comprises at least one polysiloxane in an amount of 1 to 7 phr.

14. The flame-retardant cable according to claim 1, wherein:

the flame-retardant polymer composition comprises melamine.

15. The flame-retardant cable according to claim 1, wherein:

the halogen-free polymeric base consists of said ethylene vinyl acetate copolymer, said polyethylene polymer having a density up to 0.935 $g/cm^3$, and said silane-modified polymer;

the silane-modified polymer is present in said halogen-free polymeric base in an amount of 5 to 15 phr; and the silane-modified polymer is at least one selected from the group consisting of a silane-modified ethylene vinyl acetate copolymer and a silane-modified polyethylene polymer.

* * * * *